US008659621B1

(12) United States Patent
Stiglitz et al.

(10) Patent No.: US 8,659,621 B1
(45) Date of Patent: Feb. 25, 2014

(54) ORGANIZING AND DISPLAYING DRAWING OBJECTS

(75) Inventors: Benjamin Stiglitz, Pittsburgh, PA (US); Ryan Poling, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 439 days.

(21) Appl. No.: 12/854,880

(22) Filed: Aug. 11, 2010

(51) Int. Cl.
*G09G 5/00* (2006.01)
*G06F 3/048* (2013.01)

(52) U.S. Cl.
USPC ............................ 345/619; 345/676; 715/764

(58) Field of Classification Search
USPC .......... 345/619, 676; 715/764–769, 835, 838, 715/863
See application file for complete search history.

(56) References Cited

U.S. PATENT DOCUMENTS

| | | | | | |
|---|---|---|---|---|---|
| 5,995,114 | A | * | 11/1999 | Wegman et al. | 345/440 |
| 7,263,670 | B2 | * | 8/2007 | Rekimoto | 715/837 |
| 2004/0090460 | A1 | * | 5/2004 | Kawahara | 345/764 |
| 2004/0261037 | A1 | * | 12/2004 | Ording et al. | 715/788 |
| 2004/0261038 | A1 | * | 12/2004 | Ording et al. | 715/792 |

OTHER PUBLICATIONS

Dmitry Kirsanov, The Book of Inkscape: The Definitive Guide to the Free Graphics Editor, 2009, No Starch Press, Inc, San Francisco, Chapters 2, 4-14, ISBN: 978-1-59327-181-7.*

Tavmjong Bah, Inkscape: Guide to a Vector Drawing, 2008, Prentice Hall, ISBN: 978-0-13-135794-5.*

Stephen G. Kobourov, Force-Directed Drawing Algorithms, 2004, Handbook of Graph Drawing and Visualization, CRC Press, Chapter 12, pp. 1-20.*

Pushpa Kumar, Kang Zhang, Node overlap removal in clustered directed acyclic graphs, 2009, Journal of Visual Languages & Computing, 20(6):403-419.*

Maria Langer, Mac OS X 10.4 Tiger: Visual QuickStart Guide, 2005, Peachpit Press, ISBN: 978-0-321-30526-8.*

Litt SA et al., Mac OS® X Leopard™ Bible, 2008, John Wiley & Sons, ISBN: 978-0-470-04174-1.*

Wilmot Li, Maneesh Agrawala, David Salesin, Interactive Image-Based Exploded View Diagrams, 2004, Proceedings of Graphics Interface, May 17-19, pp. 203-212.*

* cited by examiner

*Primary Examiner* — Aaron M Richer
*Assistant Examiner* — Michael J Cobb
(74) *Attorney, Agent, or Firm* — Fletcher Yoder PC

(57) ABSTRACT

A system in accordance with the present invention may include one or more programs stored in the memory, with instructions to scan for drawing objects on a drawing area of a graphics editing application, determine overlap of the drawing objects on the drawing area, analyze the overlap of the drawing objects and a force to repel each of the drawing objects on the drawing area to eliminate the overlap, and organize the drawing objects according to the force to repel each of the drawing objects on the drawing area to eliminate the overlap.

19 Claims, 7 Drawing Sheets

Figure 2

ORGANIZING AND DISPLAYING DRAWING OBJECTS

FIELD OF INVENTION

The present invention relates generally to the field of graphics editing and, in particular, to the field of organizing and displaying drawing objects in a graphics editing application.

BACKGROUND OF INVENTION

Current graphics editing applications may include features and tools for drawing lines, circles, squares, rectangles, triangles, and other shape-types. In addition, current graphics editing applications may also include features for sending shapes behind other shapes, bringing shapes forward from behind other shapes, filling shapes with colors/styles, inserting text/pictures, drawing with a pencil/paintbrush-type tool, rotating/flipping shapes, aligning text or shapes to the left/center/right, and for manually moving shapes around a drawing area/canvas.

However, current graphics editing applications do not provide a system or method for automatically organizing overlapping drawing objects and displaying them as non-overlapping drawing objects in a graphics editing application. In particular, current graphics editing applications do not provide a feature or tool for organizing overlapping drawing objects on a drawing area/canvas into non-overlapping drawing objects that allow the display and selection of previously hidden drawing objects, without changing the position of other drawing objects, and returning the drawing objects to their initial position. In addition, current graphics editing applications do not provide an option to select and display a previously hidden drawing object on the top of overlapping drawing objects. Furthermore, current graphics editing applications do not provide for the organization of overlapping drawing objects into non-overlapping drawing objects that are continuously viewable on the graphics editing application user interface as they are moved, or provide that, as the overlapping drawing objects are organized into non-overlapping drawing objects, the drawing objects are each reduced by a proportion when the graphics editing application determines that organizing the drawing objects by repelling each of them to eliminate any overlap would cause at least one outer drawing object to move off at least one outer boundary of the drawing area.

SUMMARY OF THE INVENTION

Accordingly, the present invention is directed to a system and method for organizing and displaying drawing objects in a graphics editing application that substantially obviates one or more problems due to limitations and disadvantages of the related art.

In an embodiment, the present invention provides a method for organizing drawing objects in a graphics editing application by scanning for the drawing objects on a drawing area of the graphics editing application, determining overlap of the drawing objects on the drawing area, analyzing the overlap of the drawing objects and a force to repel each of the drawing objects on the drawing area to eliminate the overlap, and organizing the drawing objects according to the force to repel each of the drawing objects on the drawing area to eliminate the overlap.

In another embodiment, a system comprises one or more processors, memory, a display device, and one or more programs stored in memory, where the one or more programs have instructions to scan for drawing objects on a drawing area of a graphics editing application, determine overlap of the drawing objects on the drawing area, analyze the overlap of the drawing objects and a force to repel each of the drawing objects on the drawing area to eliminate the overlap, and organize the drawing objects according to the force to repel each of the drawing objects on the drawing area to eliminate the overlap.

In yet another embodiment, a computer-readable storage medium stores one or more programs configured for execution by a computer, the one or more programs having instructions to scan for drawing objects on a drawing area of a graphics editing application, determine overlap of the drawing objects on the drawing area, analyze the overlap of the drawing objects and a force to repel each of the drawing objects on the drawing area to eliminate the overlap, and organize the drawing objects according to the force to repel each of the drawing objects on the drawing area to eliminate the overlap.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principles of the invention. In the drawings.

DETAILED DESCRIPTION

Reference will now be made in detail to embodiments, examples of which are illustrated in the accompanying drawings. In the following detailed description, numerous non-limiting specific details are set forth in order to assist in understanding the subject matter presented herein. It will be apparent, however, to one of ordinary skill in the art that various alternatives may be used without departing from the scope of the present invention and the subject matter may be practiced without these specific details. For example, it will be apparent to one of ordinary skill in the art that the subject matter presented herein can be implemented on any type of standalone system or client-server compatible system containing any type of client, network, server, and database elements.

Figure 1:
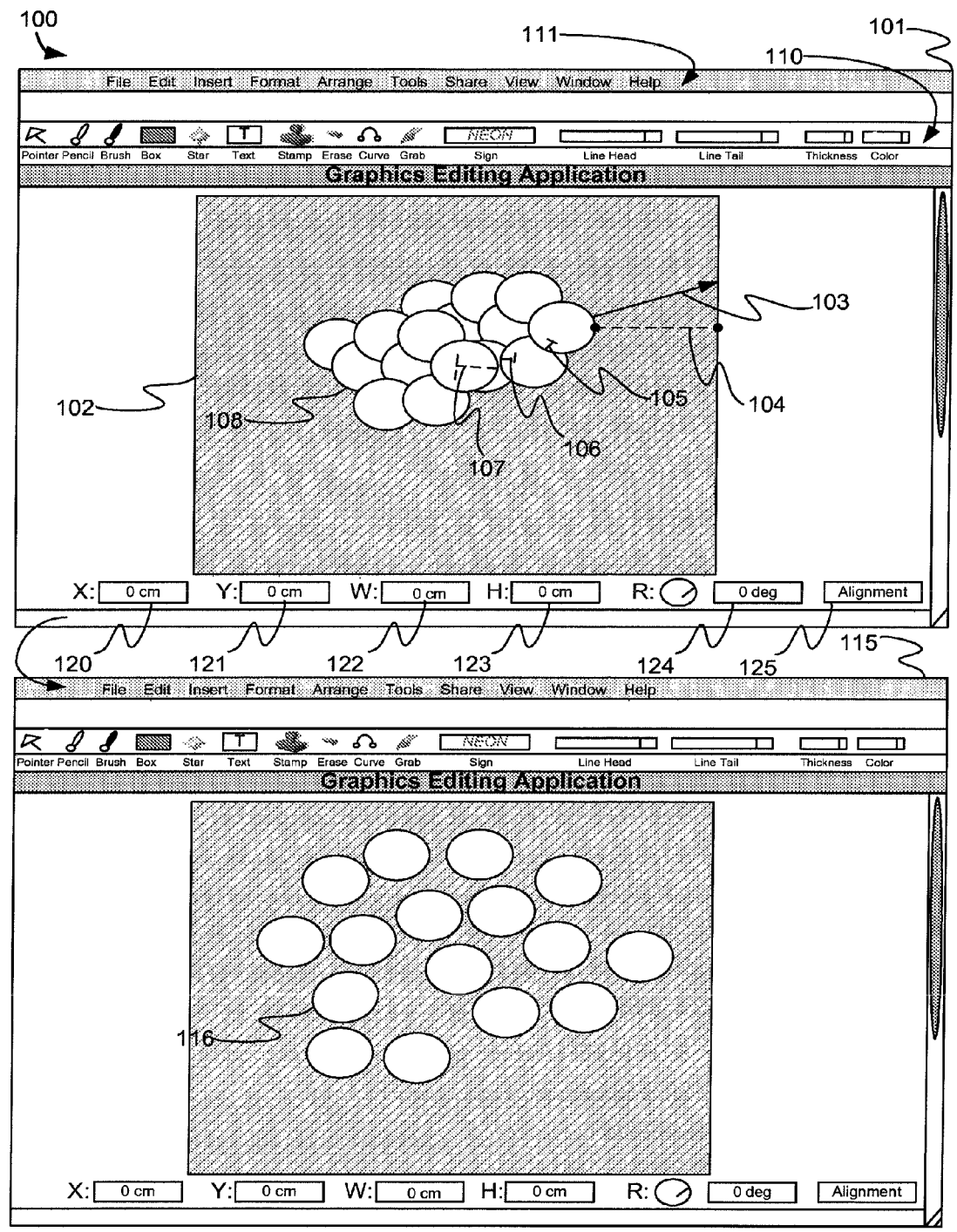
FIG. 1 illustrates an exemplary embodiment of a graphics editing application organizing drawing objects in accordance with the present invention.

FIG. 1 illustrates an exemplary embodiment 100 of a graphics editing application 101 organizing and displaying drawing objects (as shown in graphic editing application 115) in accordance with the present invention. In the exemplary embodiment 100, a user may activate the graphics editing application 101 to draw, edit, manipulate, and view various graphics, including shapes, such as lines, squares, circles, rectangles, triangles, other shape-types, and text/pictures, each separately or in combinations. In exemplary embodiment 100, a user may activate the graphics editing application 101 to draw, manipulate, edit, and view various graphics in a drawing area 102 (or, canvas). The graphics editing application 101 may include several menu features 111 such as, for example, file, edit, insert, format, arrange, tools, share, view, window, and help. Each of these menu features 111 may further include additional features or options for creating, editing, and/or manipulating a graphics presentation through the graphics editing application 101. Each of the menu features 111, as well as any additional features or options, may have one or more corresponding modules/engines for implementing the execution of the invoked menu feature or option by sending instructions to one or more computer processors for execution.

In exemplary embodiment 100, the graphics editing application 101 may also include several icon shortcuts 110 to menu features or options. The icon shortcuts 110 may have one or more corresponding modules/engines for implementing the execution of the invoked menu feature or option by sending instructions to one or more computer processors for execution. Icon shortcuts 110 may be selected by a user to draw drawing objects, such as circles 108, in the display area 102. The coordinates X 120 and Y 121 of a selected circle of the circles 108 or other drawing objects drawn in the display area 102 may be displayed by the graphics editing application 101. The width 122, height 123, rotation 124, and alignment 125 of a selected circle of the circles 108 or other drawing object drawn in display area 102 may also be displayed by the graphics editing application 101.

Figure 3:
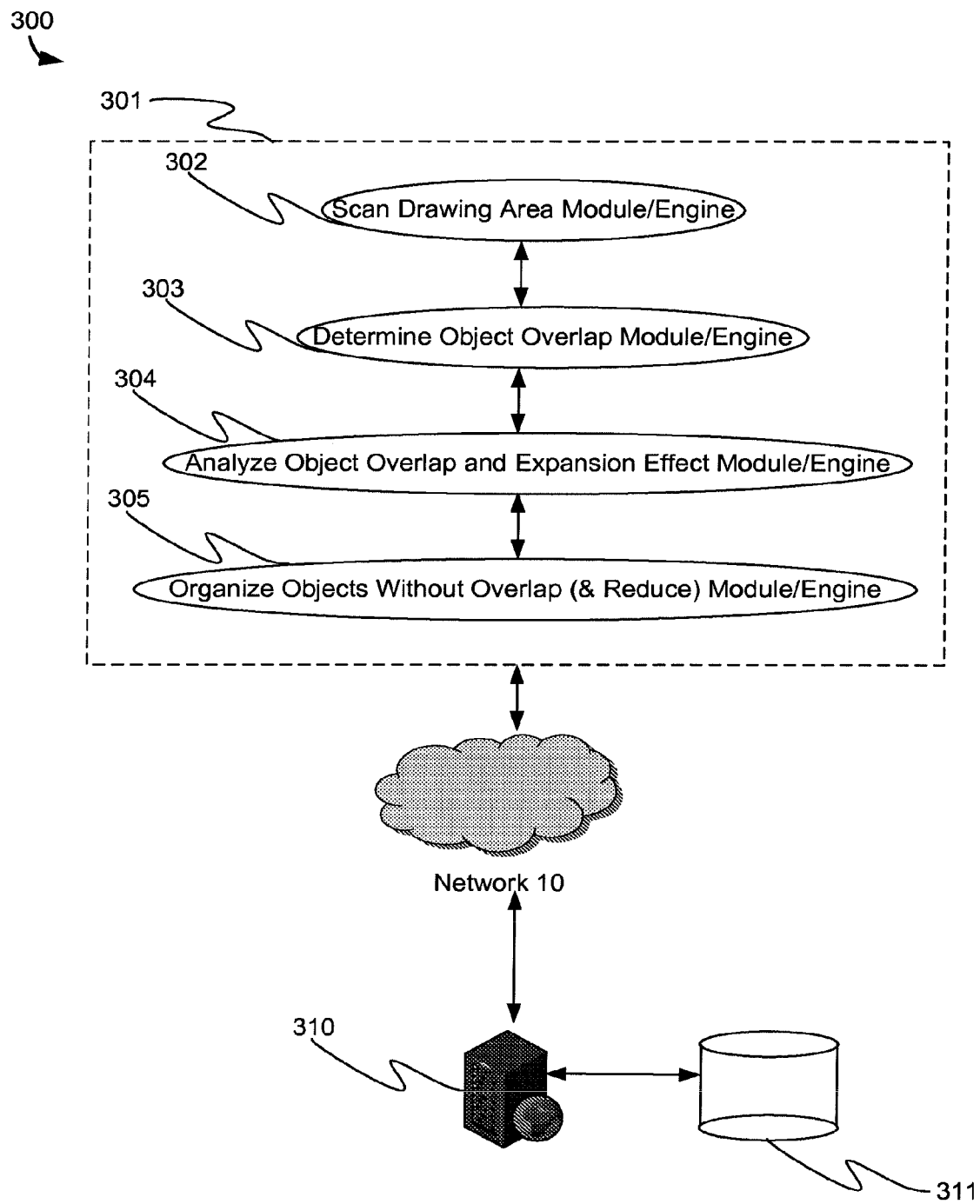
FIG. 3 illustrates exemplary modules of a graphics editing application in accordance with the present invention.
Figure 5:
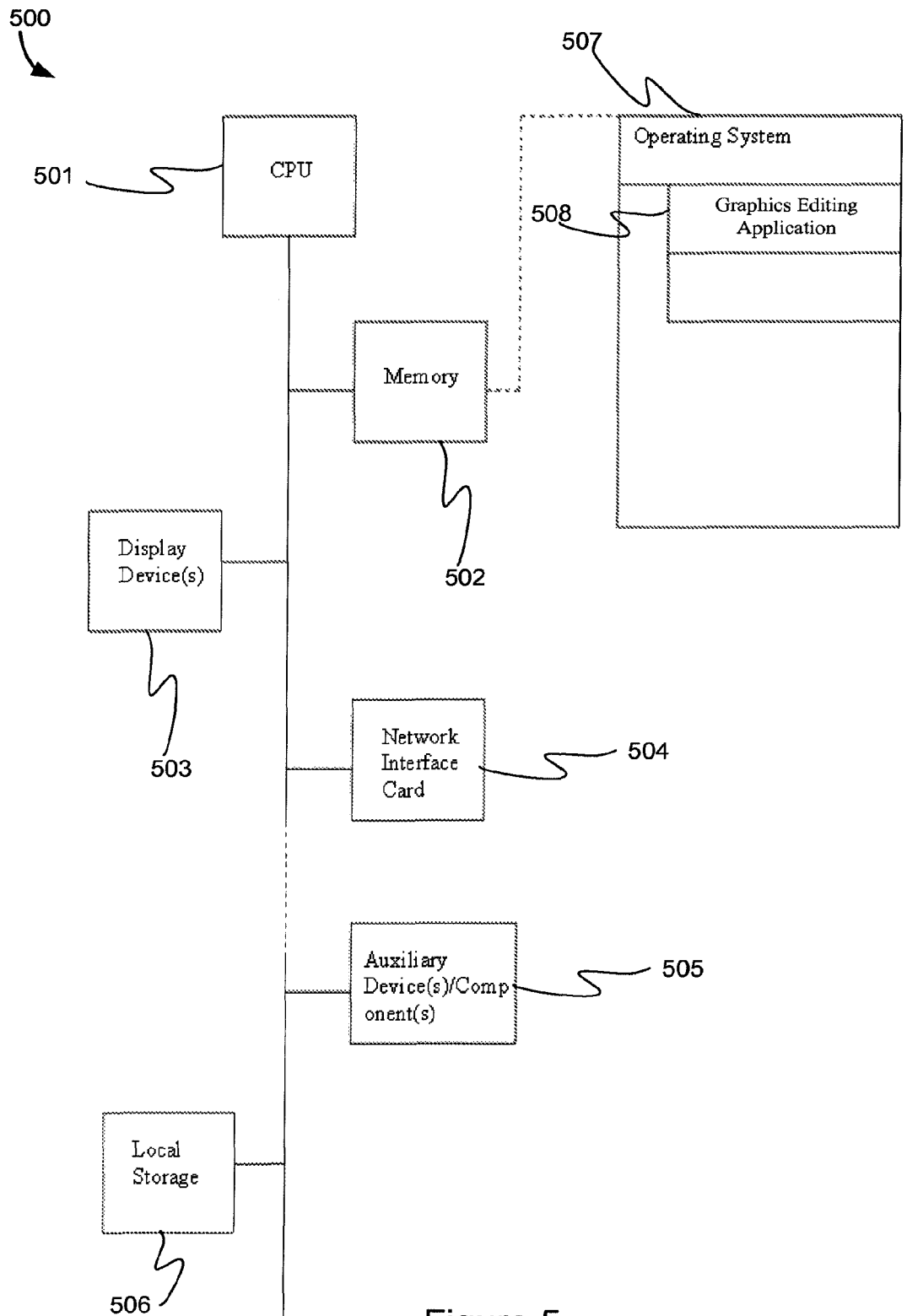
FIG. 5 illustrates an exemplary system block diagram of a system executing a graphics editing application in accordance with the present invention.

The graphics editing application 101 may interact and communicate with a graphics editing application module 301 (shown in FIG. 3; also shown in FIG. 5 as graphics editing application module 508). Graphics editing application module 301 may be implemented in an object-oriented programming language, such as Objective-C, C, C++, and/or Java. Graphics editing application module 301 may be a class library storing classes and/or modules/engines for carrying out one or more features of the graphics editing application module 301. For example, the modules/engines may include a scan drawing area module/engine 302, a determine object overlap module/engine 303, an analyze object overlap and expansion effect module/engine 304, and an organize objects without overlap (and reduce) module/engine 305 (all shown in FIG. 3). Each of modules 302-305 may implement one or more features or tools of the graphics editing application module 301 by sending instructions to the computer processing unit 501 (shown in FIG. 5).

In graphics editing application 101, each shape, line, image, text, etc. drawn in the display area 102 may be considered a drawing object. Data associated with the drawing objects such as, for example, coordinates X 120 and Y 121, width 122, height 123, rotation 124, and alignment 125 may be stored in a file, such as an XML/HTML file or other markup/scripting language file type. Each drawing object may have a geometry and a path. The geometry and path for each drawing object may be stored in the XML/HTML file or other file in memory 502 and/or local storage 506 (shown in FIG. 5). For example, for a circle of the circles 108 drawn in the drawing area 102, the corresponding XML/HTML or other markup/scripting language file may contain data/parameters about the X 120 and Y 121 coordinates of the circle on the drawing area 102, the width 122 of the circle from one outer boundary to the opposite outer boundary (i.e., the diameter), the height 123 of the circle from one outer boundary to the opposite outer boundary (i.e., again, the diameter), any degree of rotation 124 from the circle's original position on the drawing area 102, and whether the circle is aligned 125 to the left/center/right of the drawing area 102.

The exemplary embodiment of the graphics editing application 115 illustrates an exemplary set of drawing objects (e.g., circles 116) that have been organized by repelling (e.g., by using a physics-based force model) each of the original drawing objects (e.g., circles 108) on the drawing area 102 to eliminate overlapping such as, for example, circle overlaps 105-107 that were present. Circle overlaps 105-107 illustrate the extent of overlap between the outer boundaries of three circles on the drawing area 102. A closest distance 104 to the closest outer boundary of the drawing area 102 may be determined from the outermost circle with at least one circle overlap 105. A direction/trajectory 103 for repelling the circle is also determined based on the position of overlapping drawing objects with respect to the circle/drawing object being moved (or, repelled) to eliminate overlap.

In some embodiments, one or more modules of the graphics editing application module 301 (shown in FIG. 3) may first scan 302 the drawing area 102 to identify drawing objects (e.g., circles 108) that have one or more circle overlaps 105-107, or to identify drawing objects that may have been selected by the user on the drawing area 102. If no drawing objects are selected, then by default all drawing objects may be automatically selected. Alternatively, if no drawing objects are selected, then by default no drawing objects may be identified, and/or a no drawing objects exception may be thrown.

Then, in some embodiments, another module may determine 303 the exact length of circle overlaps 105-107 (e.g., mm, cm, inches, or other scale or measurement unit(s)) for each drawing object on the drawing area 102, as well as the other drawing objects with which such circle overlaps 105-107 are associated. In some embodiments, the area of circle overlaps (e.g., $mm^2$, $cm^2$, $inches^2$) may be determined for each drawing object on the drawing area 102. The area may be determined according to the width, height, and origin/coordinates of each drawing object. Further, determining whether drawing objects overlap may be performed by comparing every drawing object's width, height, and origin/coordinates with every other drawing object's width, height, and origin/coordinates on the drawing area 102. The scanned drawing objects and the exact length of circle overlaps 105-107 (or, area) for each drawing object on the drawing area 102 may then be stored in a data structure in memory 502 or on a file in local storage 506.

In some embodiments, after determining the circle overlaps 105-107 (or, area) of the drawing objects on the drawing area 102, an analysis 304 is performed on the circle overlaps 105-107 (or, area) to determine the vector (e.g., force) with which each of the drawing objects must be moved (or, repelled) away from every other overlapping drawing object on the drawing area 102. The results of the analysis 304 may include a trajectory for moving (or, repelling) the overlapping drawing objects, or a direction to move (or, repel) overlapping drawing objects and a speed/acceleration by which to do so. The direction may be calculated by determining the difference between the center-points of two or more drawing objects using the coordinates of each drawing object on the drawing area 102. For example, each drawing object may have a vector calculated by the analysis 304 and that may be added to each other overlapping drawing object's vector to yield a resultant vector that is then applied to each of the overlapping drawing objects. Each drawing object may be moved according to the direction and magnitude of the resultant vector.

In some embodiments, larger drawing objects may appear on the drawing area 102 to be moving at a slower speed than smaller drawing objects as they transition from their initial state 108 to their final state 116. The opposite may be true for smaller drawing objects. The speed at which drawing objects move on the drawing area 102 may be determined by the total area of overlap divided by, for example, the width multiplied by the height (e.g., W×H) of the object. As a result, drawing objects of differing sizes may move on the drawing area 102 at variable speeds.

In some embodiments, if the longest overlap length is sufficient to eliminate the overlap of a drawing object with every other drawing object, then the drawing object may be moved (or, repelled) in a direction/trajectory directly opposite to that of the overlapping drawing object. If the longest overlap length, however, is not sufficient to eliminate the overlap of a drawing object with every other drawing object, then the drawing object may be moved (or, repelled) first in a direction/trajectory directly opposite to that of the overlapping drawing object with the longest overlap length; then, the drawing object may be moved (or, repelled), again, a distance equal to the longest overlap length that now exists after the first move. Further, the direction/trajectory is directly opposite to that of the overlapping drawing object with the longest overlap length.

The organization process 305 (shown in FIG. 3) is repeated for each and every drawing object of the drawing area 102 until every drawing object is moved (or, repelled) away from every overlapping drawing object on the drawing area 102. The organization process 305 may also be executed for all drawing objects concurrently. The result is a display on the drawing area 102 of a set of drawing objects (e.g., circles 116) that do not overlap, making visible (e.g., in an exploded view) any drawing objects that were not visible previously (e.g., because of their z-coordinate order) when the drawing objects overlapped. These drawing objects may now be selected and the remainder of the drawing objects may be returned to their initial state 108 as overlapping drawing objects (e.g., circles) on the drawing area 102. Using one or more keyboard, touchpad, or other shortcut (e.g., holding the option key) the selected drawing objects may be moved to the top of the other overlapping drawing objects even after they return to their initial state 108 as overlapping drawing objects.

In some embodiments, a fixed constant may be added to, or a fixed multiplier greater than one may be multiplied by, the longest overlap length (or, area) when moving (or, repelling) each drawing object from an overlapping drawing object. This added operation may introduce a space/buffer between every drawing object being moved away from an overlapping drawing object. Moreover, in some embodiments, prior to moving (or, repelling) any drawing object away from another drawing object, the distance 104 from the other boundary of the drawing object being moved to an outer boundary of the drawing area 102 is analyzed 304 (shown in FIG. 3). The distance 104 is analyzed 304 to determine if the longest overlap length (or, area), plus any constant, or multiplied by any multiplier greater than one, is less than or at least equal to the distance 104. If not, then the drawing object being moved (or, repelled) would, if moved, lie outside the drawing area 102, which may be impermissible and may cause an exception to be thrown by the analyze object overlap and expansion effect module/engine 304 (shown in FIG. 3). As a result, it may be possible that the other drawing object is repelled away from the drawing object, which has been determined to be a distance 104 too near to the outer boundary of the drawing area 102. Alternatively, in some embodiments, the drawing object sought to be moved may be skipped-over and placed at the end of a queue, which may be stored in memory 502 (shown in FIG. 5), for drawing objects that are too near to the outer boundary of the drawing area 102; the drawing objects identified in the queue may then be moved (or, repelled) when all the other drawing objects have been moved.

In some embodiments, if after moving all of the other drawing objects, it would not be possible to eliminate circle overlaps 105-107 without causing one or more drawing objects to lie outside the drawing area 102, then the drawing objects too close to the outer boundary of the drawing area 102 may be reduced in size by a proportion that would eliminate overlap without causing the drawing object to lie outside the drawing area 102 when moved (or, repelled); alternatively, all of the drawing objects may be reduced in size by a proportion (see FIG. 2), which may be done as soon as it is determined 304 that a drawing object being moved (or, repelled) would lie outside the drawing area 102 if moved a distance 104 from its outer boundary to the outer boundary of the drawing area 102. The proportion may be calculated by the analyze object overlap and expansion effect module/engine 304 (shown in FIG. 3) and may be a ratio of the distance 104 to move the drawing object to the longest overlap length, or a fixed proportion such as ½, ¼, etc.

Figure 2:
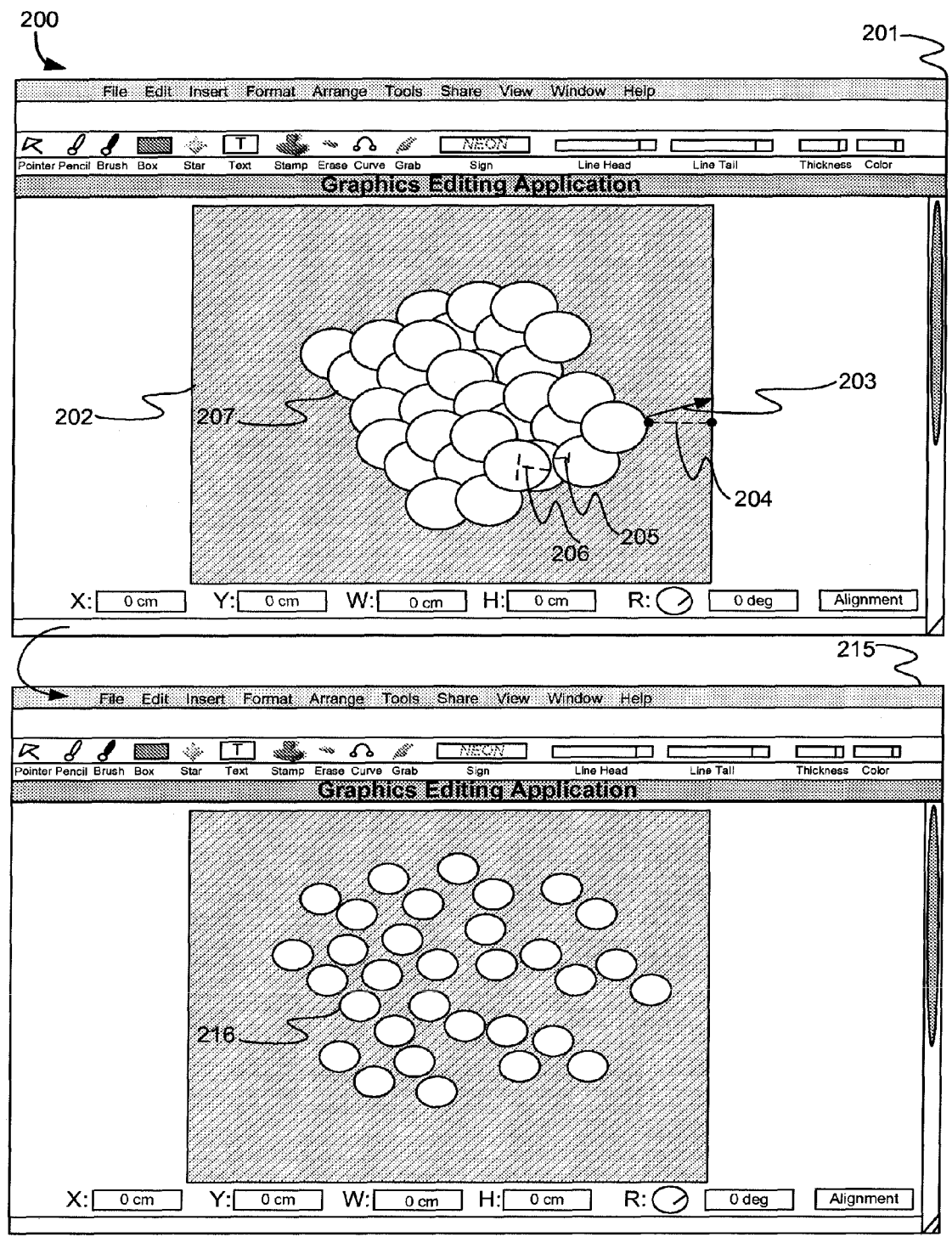
FIG. 2 illustrates an exemplary embodiment of a graphics editing application organizing drawing objects and reducing the apparent size of drawing objects in accordance with the present invention.

FIG. 2 illustrates an exemplary embodiment 200 of a graphics editing application 201 organizing drawing objects and reducing the apparent size of drawing objects 216 in the drawing area of the graphics editing application 215 in accordance with the present invention. As described above for FIG. 1, the steps for eliminating the overlap of drawing objects include scanning 302 the drawing area 202 to identify drawing objects (e.g., circles 207) that have one or more circle overlaps 205-206, or to identify drawing objects that may have been selected by the user on the drawing area 202, determining 303 object (e.g., circle) overlaps 205-206 between one or more drawing objects on the drawing area 202, analyzing 304 the object overlaps 205-206 and the effect of moving (or, repelling) the drawing objects on the drawing area 202 (e.g., by determining a direction/trajectory 203), and organizing 305 the overlapping drawing objects such that the outermost drawing objects are not moved a distance greater than a distance 204 from the outer boundary of the outermost drawing object to the outer boundary of the drawing area 202. FIG. 2 illustrates an exemplary embodiment where the drawing objects may be reduced in size by a proportion when the analyze object overlap and expansion effect module/engine 304 determines that a drawing object being moved (or, repelled) would lie outside the drawing area 202 if moved a distance 204 from its outer boundary to the outer boundary of the drawing area 202. The drawing objects (e.g., circles 207) are each reduced in size 216 by the organize objects without overlap and reduce module/engine 305 according to a proportion calculated by the analyze object overlap and expansion effect module/engine 304 (shown in FIG. 3). The proportion may be a ratio of the distance 204 to move the drawing object to the longest overlap length, or a fixed proportion such as ½, ¼, etc. When reducing the drawing objects from their original size to their reduced size, the data associated with the drawing objects such as, for example, width 122, height 123, rotation 124, and alignment 125 (shown in FIG. 1) may be accessed from a file stored in memory 502 or local storage 506 (shown in FIG. 5) such that any reduction in size maintains the overall symmetry, orientation, alignment, and/or shape of the drawing objects.

FIG. 3 illustrates exemplary modules 300 of a graphics editing application 301 in accordance with the present invention. The graphics editing application 301 may include modules for scanning a drawing area 302, determining object overlap 303, analyzing the object overlap and the effect of expansion 304 to eliminate any overlapping drawing objects while keeping the drawing objects within a drawing area, and organizing drawing objects such that there is no overlap and reducing the drawing objects 305 if organizing the drawing objects would cause one or more to lie outside the drawing area.

In some embodiments, one or more of these modules 302-305 may communicate with a server 310 and database 311 hosted on the server 310 over a network 10. For example, one or more modules 302-305 may retrieve an XML/HTML file or other file type from the database 311. The file may include data about the drawing objects.

In some embodiments, the graphics editing application 301 may be executed on the server 310 and a client application (not shown) may communicate with the graphics editing application 301 over the network 10, while the client application executes on a laptop, handheld device, or other device with a processor capable of executing the client application.

Figure 4:
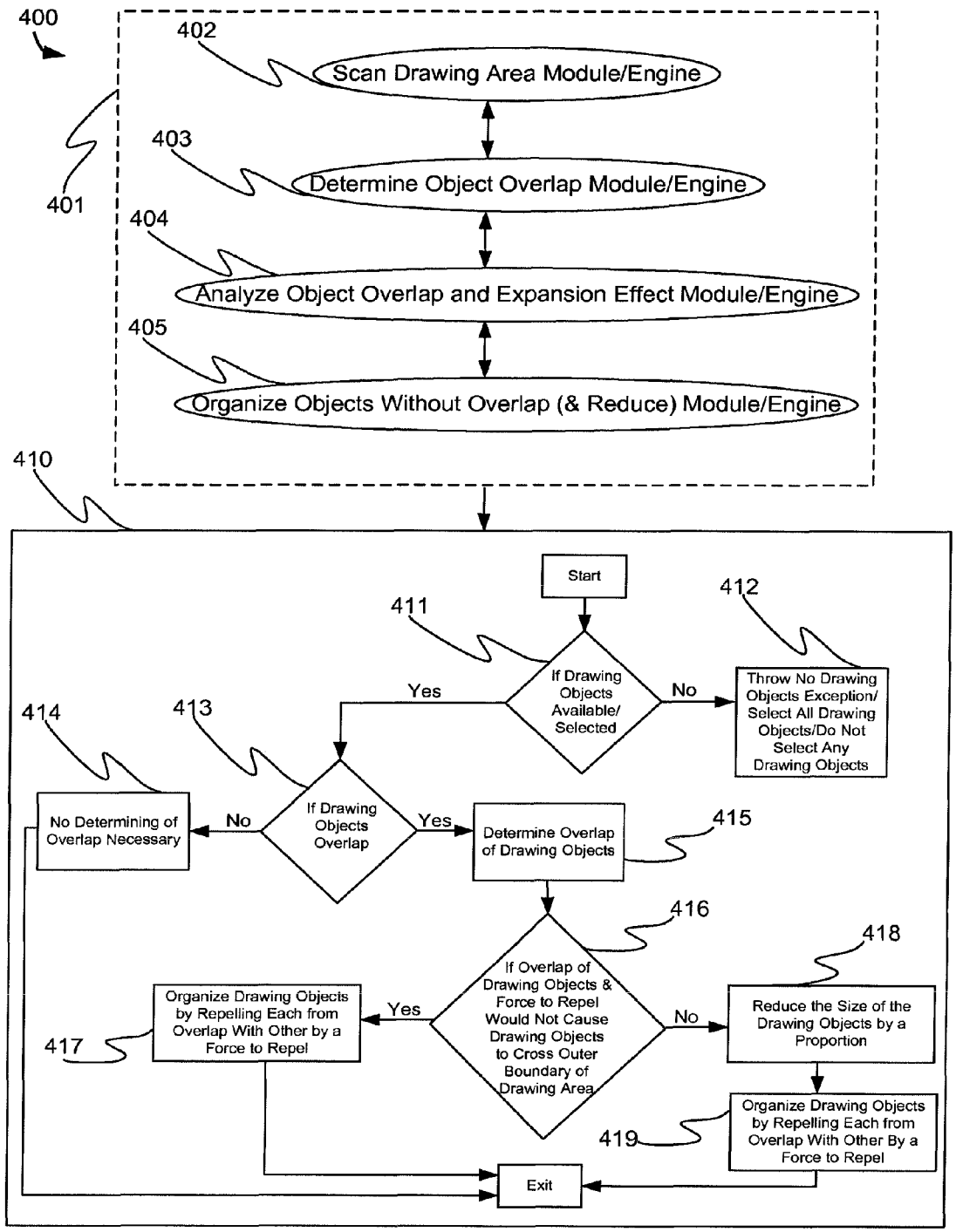
FIG. 4 illustrates an exemplary process flow diagram of the operation of exemplary modules of a graphics editing application in accordance with the present invention.

FIG. 4 illustrates an exemplary process flow diagram 400 of the operation of exemplary modules of a graphics editing application 401 in accordance with the present invention. The graphics editing application 401 may include modules for scanning a drawing area 402, determining object overlap 403, analyzing the object overlap and the effect of expansion 404 to eliminate any overlapping drawing objects while keeping the drawing objects within a drawing area, and organizing then displaying the drawing objects such that there is no overlap and reducing the drawing objects 405 if organizing the drawing objects would cause one or more to lie outside the drawing area. The exemplary steps 410 of the execution of the modules 402-405 of the graphics editing application 401 include the scan drawing area module/engine 402 first determining if there are drawing objects available or selected on the drawing area 411. If there are no drawing objects available or selected, the scan drawing area module/engine 402 may select all of the drawing objects, or select none of the drawing objects and/or throw a no drawing objects selected/available exception 412. An exception handler (not shown) may then handle the exception by returning back to the application 401 state prior to invoking the scan drawing area module/engine 402. If there are drawing objects available or selected, the scan drawing area module/engine 402 may then determine if the drawing objects overlap 413. An overlap of drawing objects may occur when, after analyzing the X 120 and Y 121 coordinates as well as the width 122 and height 123 (shown in FIG. 1) of each scanned drawing object on the drawing area, it is determined that based on these data parameters two or more drawing objects may overlap. This process is repeated for each drawing object on the drawing area. If the scan drawing area module/engine 402 determines that there is no overlap between any two or more drawing objects 414, then it may exit and the graphics editing application 401 may return to the state it was in prior to invoking the module/engine 402. If the scan drawing area module/engine 402 determines that there may be overlap of two or more drawing objects, the determine object overlap module/engine 403 may then determine the exact length or area of any overlaps 415 for each drawing object on the drawing area, as well as the other drawing objects with which such overlaps are associated. After determining the overlaps of the drawing objects, an analyze object overlap and expansion effect module/engine 404 performs an analysis 416 on the circle overlaps to determine the distance or force that each of the drawing objects must be moved (or, repelled) away from every other overlapping drawing object on the drawing area. The analysis 416 includes determining if the overlap of drawing objects and, thus, the force to repel the drawing objects would cause the drawing object to cross the outer boundary of the drawing area. If the force to repel the drawing objects would not cause the drawing objects to cross the outer boundary of the drawing area, then the drawing objects are organized 417 by repelling each from the other by the force to repel. If the force to repel the drawing objects would cause the drawing objects to cross the outer boundary of the drawing area, then the size of the drawing objects is reduced 418 by a proportion 418 and then the drawing objects are repelled from each other by the force to repel 419. The organize objects without overlap and reduce module/engine 405 may perform the step to organize 417 the drawing objects on the drawing area. The organize objects without overlap and reduce module/engine 405 may perform the steps of reducing 418 the size of the drawing objects and organizing 419 the drawing objects on the drawing area. After all of the drawing objects have either been moved (or, repelled) from overlapping drawing objects, reduced in size by a proportion, or reduced in size and moved (or, repelled) from overlapping drawing objects, the organize objects without overlap and reduce module 405 may exit and the graphics editing application 401 may return to the state it was in prior to invoking the module/engine 402.

FIG. 5 illustrates an exemplary system block diagram of a system 500 executing a graphics editing application 508 in accordance with the present invention. The system may include a computer processing unit (CPU) 501, memory 502 (e.g., volatile or non-volatile), display device(s) 503, network interface card (NIC) 504, an interface for auxiliary device(s)/component(s) 505, and local storage 506 (e.g., non-volatile). An operating system 507 may reside in local storage 506, remotely on a network accessible by the NIC 504, and/or memory 502. Instructions being executed by the CPU 501 may be fetched from memory 502 and may include instructions from one or more modules of graphics editing application 508 and/or one or more other applications. The system 500 may be a handheld device, laptop computer, desktop computer, server, or some other system capable of housing the components 501-506.

Figure 6:
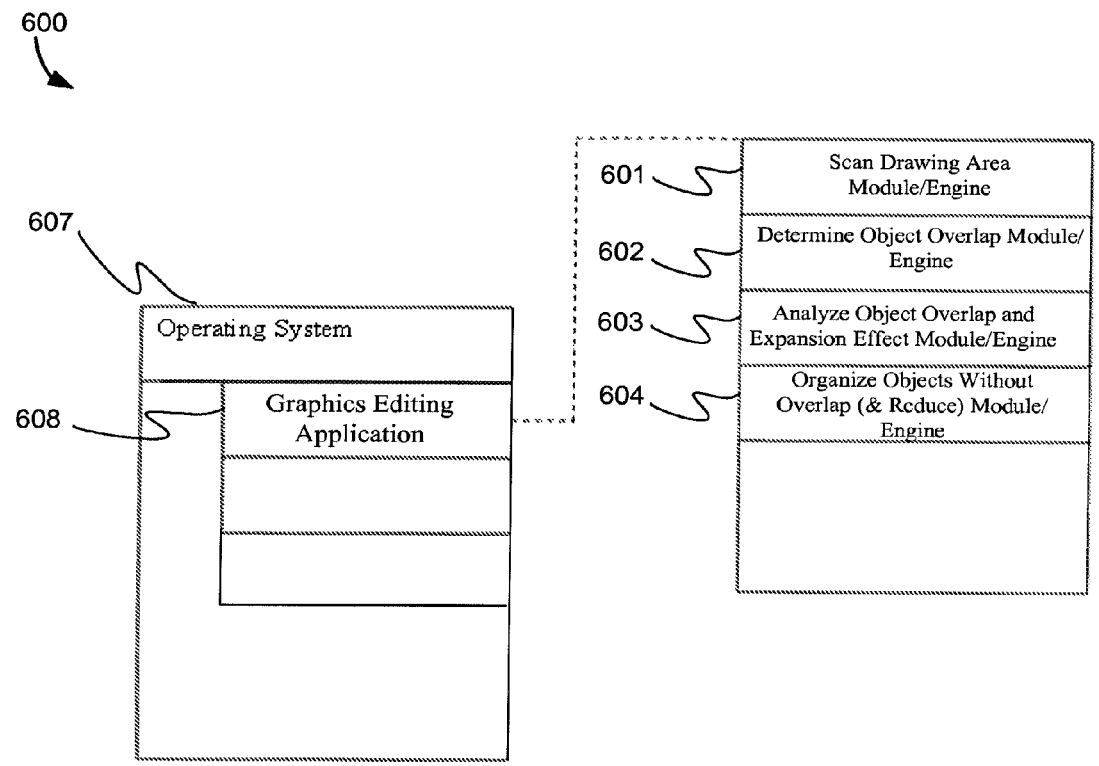
FIG. 6 illustrates an exemplary module block diagram of the execution of the modules/engines of a graphics editing application in accordance with the present invention.

FIG. 6 illustrates an exemplary module block diagram 600 of the execution of the modules/engines of a graphics editing application 608 in accordance with the present invention. The graphics editing application 608 may be executed via an operating system 607 responsible for managing the system on which it is stored or configured to manage. The graphics editing application 608 may include one or more modules/engines for executing the instructions corresponding to the graphics editing application 101, 115, 201, 215, 301, and 401. The modules may include a scan drawing area module/engine 601, a determine object overlap module/engine 602, an analyze object overlap and expansion effect module/engine 603, and an organize objects without overlap and reduce module/engine 604.

Figure 7:
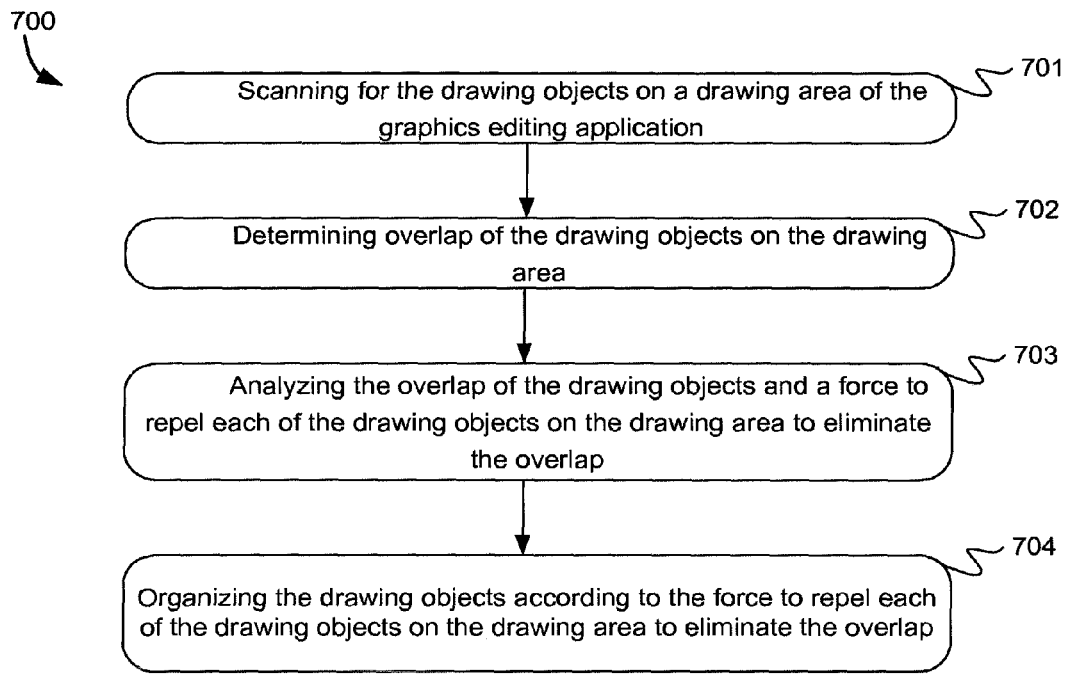
FIG. 7 illustrates exemplary method steps of a graphics editing application in accordance with the present invention.

FIG. 7 illustrates exemplary method steps 700 of a graphics editing application in accordance with the present invention. The computer-implemented method steps are for organizing drawing objects in a graphics editing application by scanning for the drawing objects on a drawing area of the graphics editing application 701, determining overlap of the drawing objects on the drawing area 702, analyzing the overlap of the drawing objects and a distance to repel each of the drawing objects on the drawing area to eliminate the overlap 703, and organizing the drawing objects according to the distance to repel each of the drawing objects on the drawing area to eliminate the overlap 704.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

We claim:

1. A computer-implemented method for organizing drawing objects in a graphics editing application, comprising:
    scanning for the drawing objects in an initial position of a drawing area of the graphics editing application;
    determining overlap of the drawing objects on the drawing area;
    analyzing the overlap of the drawing objects and a force to repel each of the drawing objects on the drawing area to eliminate the overlap;
    organizing the drawing objects in a second position according to the force to repel each of the drawing objects on the drawing area to eliminate the overlap;
    wherein organizing the drawing objects in the second position comprises:
        when the longest overlap length of the drawing objects is sufficient to eliminate the overlap of a particular drawing object with every other drawing object, moving the particular drawing object in a direction directly opposite to that of the overlapping drawing object having the longest overlap to eliminate the overlap; and
        when the longest overlap length of the drawing objects is not sufficient to eliminate the overlap of the particular drawing object with every other drawing object:
            moving the particular drawing object a first distance in a first direction directly opposite to that of the overlapping drawing object with the longest overlap length; and
            subsequently moving the particular drawing object a second distance in a second direction directly opposite to that of the overlapping drawing object with the longest overlap length after the first move, wherein the second distance is a distance of the longest overlap length after the movement of the first distance to eliminate the overlap;
    and
    subsequent to organizing the drawing objects in the second position, returning the drawing objects to the initial position.

2. The computer-implemented method of claim 1, wherein the objects organized in the second position enable subsequent features of the graphics editing application to be applied to the drawing objects in the second position, wherein the subsequent features comprise filling shapes with colors, filling shapes with styles, inserting text, inserting pictures, drawing with a pencil tool, drawing with a paintbrush tool, rotating a shape, or flipping a shape, or any combination thereof.

3. The computer-implemented method of claim 1, wherein the determining overlap of the drawing objects comprises determining a distance between outer boundaries of the drawing objects or an area of overlap.

4. The computer-implemented method of claim 3, wherein the distance between outer boundaries of the drawing objects or the area of overlap is a factor in a speed by which the drawing objects are repelled away from each other.

5. The computer-implemented method of claim 1, wherein the force to repel each of the drawing objects on the drawing area comprises a magnitude.

6. The computer-implemented method of claim 1, wherein the force to repel each of the drawing objects on the drawing area comprises a direction.

7. The computer-implemented method of claim 1, wherein the organizing the drawing objects according to the force to repel each of the drawing objects comprises reducing the size of the drawing objects by a proportion.

8. The computer-implemented method of claim 7, wherein the proportion is a minimum proportion to maintain the drawing objects within the drawing area when organizing the drawing objects.

9. The computer-implemented method of claim 7, wherein the reducing the size of the drawing objects by the proportion is performed concurrently with the organizing the drawing objects according to the force to repel each of the drawing objects.

10. A system, comprising:
    one or more processors;
    memory;
    a display device;
    one or more programs stored in memory, the one or more programs comprising instructions to:
    scan for drawing objects in an initial position of a drawing area of a graphics editing application;
    determine overlap of the drawing objects on the drawing area;
    analyze the overlap of the drawing objects and a force to repel each of the drawing objects on the drawing area to eliminate the overlap;
    organize the drawing objects in a second position according to the force to repel each of the drawing objects on the drawing area to eliminate the overlap to enable subsequent features of the graphics editing application to be applied to the drawing objects in the second position, wherein organizing the drawing objects in the second position comprises:
        determining if the longest overlap length of the drawing objects is sufficient to eliminate the overlap of a particular drawing object with every other drawing object;
        when the longest overlap length of the drawing objects is sufficient to eliminate the overlap of a particular drawing object with every other drawing object, moving the particular drawing object in a direction directly opposite to that of the overlapping drawing object having the longest overlap to eliminate the overlap; and
        when the longest overlap length of the drawing objects is not sufficient to eliminate the overlap of the particular drawing object with every other drawing object:
            determining a first direction directly opposite to that of the overlapping drawing object with the longest overlap length and a first distance to move the particular drawing object to eliminate the overlap with that overlapping drawing object;
            determining a second direction directly opposite to that of the overlapping drawing object with the longest overlap length if the particular drawing object were moved the first distance in the first direction and determining a second distance to move the particular drawing object, wherein the second distance is the longest overlap length that would exist if the particular drawing object were moved the first distance in the first direction; and moving the particular drawing object according to the determinations of the first direction and the second direction and the determined first distance and the second distance to eliminate the overlap; and return the drawing objects to the initial position.

11. The system of claim 10, wherein the subsequent features comprise filling shapes with colors, filling shapes with styles, inserting text, inserting pictures, drawing with a pencil tool, drawing with a paintbrush tool, rotating a shape, or flipping a shape, or any combination thereof.

12. The system of claim 10, wherein the determining overlap of the drawing objects comprises determining a distance between outer boundaries of the drawing objects or an area of overlap.

13. The system of claim 12, wherein the distance between outer boundaries of the drawing objects or the area of overlap is a factor in a speed by which the drawing objects are repelled away from each other.

14. The system of claim 10, wherein the force to repel each of the drawing objects on the drawing area comprises a magnitude.

15. The system of claim 10, wherein the force to repel each of the drawing objects on the drawing area comprises a direction.

16. The system of claim 10, wherein the organizing the drawing objects according to the force to repel each of the drawing objects comprises reducing the size of the drawing objects by a proportion.

17. The system of claim 16, wherein the proportion is a minimum proportion to maintain the drawing objects within the drawing area when organizing the drawing objects.

18. The system claim 16, wherein the reducing the size of the drawing objects by the proportion is performed concurrently with the organizing the drawing objects according to the force to repel each of the drawing objects.

19. A tangible, non-transitory, computer-readable storage medium storing one or more programs configured for execution by a computer, the one or more programs comprising instructions to:

scan for drawing objects in an initial position of a drawing area of a graphics editing application;

determine overlap of the drawing objects on the drawing area;

analyze the overlap of the drawing objects and a force to repel each of the drawing objects on the drawing area to eliminate the overlap;

organize the drawing objects in a second position according to the force to repel each of the drawing objects on the drawing area to eliminate the overlap, wherein the instructions to organize the drawing objects in the second position comprise instructions to:

determine if the longest overlap length of the drawing objects is sufficient to eliminate the overlap of a particular drawing object with every other drawing object;

when the longest overlap length of the drawing objects is sufficient to eliminate the overlap of a particular drawing object with every other drawing object, moving the particular drawing object in a direction directly opposite to that of the overlapping drawing object having the longest overlap to eliminate the overlap, and when the longest overlap length of the drawing objects is not sufficient to eliminate the overlap of the particular drawing object with every other drawing object:

determine a first direction directly opposite to that of the overlapping drawing object with the longest overlap length and a first distance to move the particular drawing object to eliminate the overlap with that overlapping drawing object;

subsequently determine a second direction directly opposite to that of the overlapping drawing object with the longest overlap length if the particular drawing object were moved the first distance in the first direction and determining a second distance to move the particular drawing object, wherein the second distance is the longest overlap length that would exist if the particular drawing object were moved the first distance in the first direction; and move the particular drawing object according to the determinations of the first direction and the second direction and the determined first distance and the second distance to eliminate the overlap;

select a subset of the drawing objects in the second position; and return the drawing objects not among the subset to the initial position while retaining the subset of the drawing objects in the second position.

* * * * *